Nov. 26, 1963 A. BOSONI 3,111,964
THERMOPLASTIC TUBING AND METHOD FOR PRODUCING THE SAME
Filed Sept. 13, 1957
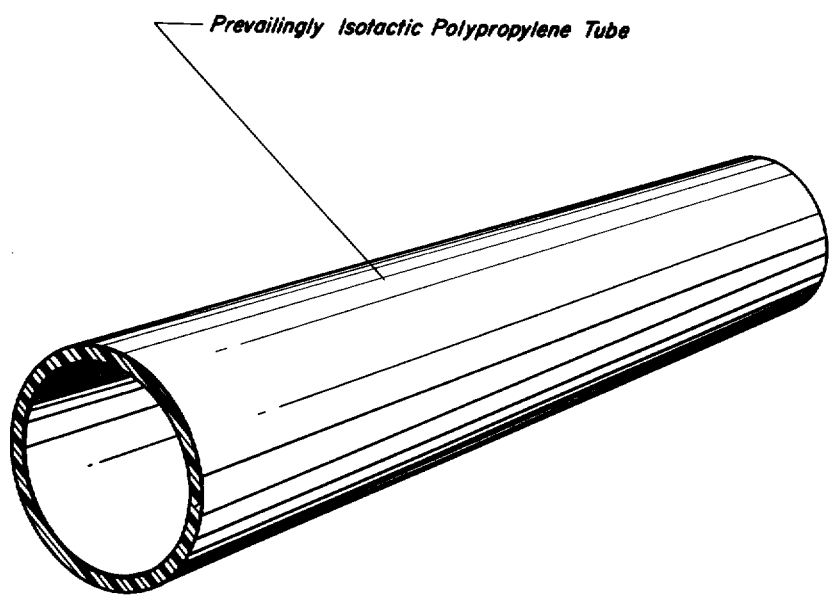
INVENTOR
ACHILLE BOSONI
BY
ATTORNEYS

United States Patent Office 3,111,964
Patented Nov. 26, 1963

3,111,964
THERMOPLASTIC TUBING AND METHOD FOR
PRODUCING THE SAME
Achille Bosoni, Milan, Italy, assignor to Montecatini
Società Generale per l'Industria Mineraria e Chimica,
a corporation of Italy
Filed Sept. 13, 1957, Ser. No. 683,861
Claims priority, application Italy Sept. 21, 1956
3 Claims. (Cl. 138—118)

This invention relates to extruded thermoplastic tubing and more particularly to such tubing comprising isotactic polypropylene.

In recent times, it has been proposed to replace metal tubing with tubing made of thermoplastic synthetic resins, and tubing made from various resins has been proposed in the art.

One of the drawbacks of the synthetic resin tubing available heretofore has been that to insure that the tubing had high mechanical strength and heat-resistance, it has been necessary to provide the same with comparatively thick walls, which increases the cost of the tubing and the installation thereof. Moreover, thermoplastic synthetic resin tubing suitable for use in conveying without damage to the tubing, very hot liquids, i.e., liquids at a temperature of 100° C. or above, has not been available heretofore.

One of the objects of this invention is to provide new and novel themoplastic tubing which does not have the disadvantages of the known thermoplastic tubing.

This and other objects are accomplished by providing new tubing comprising isotactic polypropylene.

In the drawing there has been illustrated a polypropylene tubing of the type to which my invention relates.

New polymers of the alpha-olefines, $CH_2=CHR$, where R is a hydrocarbon radical have been disclosed recently by G. Natta and his colleagues.

These polymers are unique in that they are of two different steric configurations, as a result of which they are either crystallizable or amorphous and non-crystallizable. The crystallizable polymers consist essentially of macromolecules in which substantially all of the asymmetric tertiary main-chain carbon atoms of adjacent monomeric units have the same steric configuration and the main chain of the macromolecules, if fully extended in a plane, shows substantially all of the R (in the formula $CH_2=CHR$) groups on one side of the plane and substantially all of the hydrogen atoms bound to the tertiary carbon atoms on the opposite side of the plane.

The polymers in which the asymmetric tertiary carbon atoms have the aforesaid configuration have been termed "isotactic" polymers by G. Natta, and his terminology has now been adopted in the literature.

The present invention provides tubing comprising more particularly, isotactic polypropylene.

The expression "tubing" used herein is employed in its generic sense and includes various hollow cylindrical, or non-cylindrical conduits, and conducting means such as commonly referred to as tubes, pipes and the like.

The tubing can be produced using conventional equipment. Thus, a melt of the polymer (as melting point for polymer we mean the temperature at which crystalline structure disappears: for crystalline polypropylene about 170° C.) can be pressed, for example, by means of a screw device, through the annular slit of an extruder of the type commonly used in forming tubing of thermoplastic materials. The tubing may have any desired diameter, and the diameter can be controlled either by selection of the diameter of the annular slit through which the mass comprising the isotactic polypropylene is pressed, or by blowing a stream of air or other gas inert to the polymer (e.g. nitrogen, carbon dioxide, etc.) under pressure through the pin of the extruder head during extrusion of the mass.

The walls of the tubing may have any desired thickness, which can be controlled in various ways, for instance by regulating the distance between the lips of the circular orifice through which the mass is pressed.

Generally, the tubing is stretched as it proceeds from the annular slit to a storage zone. The thickness of the walls can also be controlled by regulating the rate of stretching of the tubing as it proceeds from the extruder, using suitable draw-off means.

In producing the tubing, it is desirable to heat the isotactic polypropylene to a temperature considerably above the melting point, while avoiding overheating which could damage the appearance and mechanical properties of the extruded tube. In general, the best results are obtained by progressively heating the polymer as it proceeds from the inlet end of the extruding device of the extruder head, the temperature being such that the polypropylene is brought to a temperature higher than its melting point. The temperature may be adjusted so that the polymer is heated to the extent that the temperature thereof at the time of extrusion is as much as 100° C. above the melting point.

As is now known from the disclosures of G. Natta et al., isotactic polypropylene can be obtained by polymerizing propylene with the aid of a catalyst prepared from a compound, such as a halide, of a transition metal of groups IV to VI of the periodic table, e.g., titanium trichloride, and an organometallic compound of a metal of groups II–III of the periodic table such as triethyl aluminum.

The product obtained with the aid of the aforesaid type of catalysts consist substantially entirely of isotactic polypropylene or it may comprise a mixture of isotactic and atactic (amorphous, non-crystallizable) polypropylene. The steric structure of the atactic polymers of the alpha-olefines is different from that of the isotactic polymers. The "atactic" polymers of Natta et al. are linear, head-to-tail polymers consisting essentially of macromolecules in which tertiary asymmetric carbon atoms of the main chain having the same steric configuration have substantially a statistical distribution, and the main chain of the macromolecules, if fully extended in a plane, shows the R groups and the hydrogen atoms bound to the tertiary carbon atoms substantially in random distribution on the two sides of the plane.

The polymers of different steric structure, when produced in admixture, can be separated on the basis of the differences in their steric structures by extraction from the crude polymerizate by means of selective solvents. Thus, atactic polypropylene is soluble in hot ether and can be extracted with that solvent. Extraction of the residue of the ether extraction with n-heptane removes a partially crystalline polymer and leaves a residue consisting substantially of the highly crystalline isotactic polypropylene.

The isotactic polypropylene normally has a very high average molecular weight, and has exceptionally high mechanical strength and heat-resistance which are also characteristics of the present tubing. The molecular weight of the polypropylene used in producing the tubing may vary. For instance, in some modifications, and particularly for convenience in processing, it may be desirable to form the tubing from the polypropylene at an average molecular weight not higher than about 500,000. Mixtures of the isotactic and atactic polypropylenes may be used in making the tubing, the percentage of atactic polymer being controlled depending on the characteristics desired for the tubing. In general, the amount of atactic polymer is not greater than 20%.

The temperature to which the polymer is heated for extrusion is determined by the character of the polymer and the amount of atactic polypropylene contained therein. In any event, the polymer is heated to at least 20° C. above the melting point and may be heated to 100° C. above this temperature.

The tubing comprising the isotactic polypropylene is characterized by an exceptionally high degree of shape retention. I have found that, in contrast to other kinds of thermoplastic tubing, the use of ganging mandrels for assisting the polypropylene tubing to retain its shape until it is set in the shaped condition is not required for producing a tubing having the shape imparted to it initially during the molding step and which is characterized by perfectly smooth inside and outside walls. The tubing shaped by heating the mass as it advances through the extruder can be set in the shaped condition by simply cooling it by treatment with cold water or air as it is drawn from the vicinity of the annular slit by an appropriate draw-off means.

The tubing may also be formed in cold molds and, when very thick tubes are desired, the cold molds, such as hollow molds adapted to the circulation of cold water or other cooling medium, may be preferred.

The isotactic polypropylene tubing is chemically resistant, heat-stable, corrosion-resistant, and of such flexibility that, except when the thickness of the walls prevents it, can be wound up on reels. The tubing can be readily introduced into metal tubes and pipes having a diameter slightly larger than the diameter of the isotactic polypropylene tubing, for protecting the metal against attack by corrosive liquids.

It has been the practice, in the use of tubing formed of other thermoplastic materials, to incorporate with the tube-forming material extraneous reinforcing agents such as glass or other synthetic or natural fibers, especially when a thin tubing was desired or required for any purpose. The reinforcements were necessary in order to increase the mechanical strength of the thin-walled tubing. Such reinforcements may be incorporated in the isotactic polypropylene tubing of this invention but are optional since it has been found that, as noted hereinabove, the mechanical strength of the isotactic polypropylene tubing is high, even when the tubing has very thin walls. This eliminates the necessity for extraneous reinforcing agents even when the walls of the tubing are very thin. Such extraneous reinforcing agents can be incorporated in the mass to be extruded, if desired.

The following examples are given to illustrate the invention and are not intended as limiting.

Example 1

A head-to-tail, linear polypropylene having a molecular weight of 600,000 and containing 79% of isotactic polypropylene was melt-extruded using a 2-screws extruder having a diameter of 50 mm. The extruder was maintained at 225 to 235° C., while the extruder head was maintained at 260–280° C., without the use of a chilled mandrel. The extruded tubing was water-cooled. It had a diameter of 25 x 32 mm., was perfectly smooth, both inside and outside, and was translucent.

Example 2

Using the extruder as in Example 1, a head-to-tail linear polypropylene having a molecular weight of 200,000 and containing 85% of isotactic polypropylene was extruded. The extruder was maintained at 200–210° C., while the head of the device was kept at 240–250° C. A light air pressure was maintained in the tube and a water-cooled mandrel was used. The walls of the tubing obtained (diameter 25 x 32 mm.) were perfectly smooth, inside and outside. The mechanical properties of the tubing were compared with those of a similar conventional tubing of commercial polyethylene, with the results shown in the following table—

|  | Tubing of Polyethylene (M.W. 25,000) | Tubing of Example 2 above |
| --- | --- | --- |
| Density | 0.92 | 0.90 |
| Melting point, °C | 107–112 | 164–168 |
| Tensile yield point, kg./cm.$^2$ | 105 | 380 |
| Elongation, percent | 400 | 500 |
| Softening point: Vicat—1 kg. load, °C | 92 | 150 |
| Softening point: Vicat—5 kg./load, °C | 80 | 110 |

The new tubing may comprise solid, head-to-tail linear polypropylene having widely varying molecular weight, as shown in the examples, and selected in dependence on the end use of the tubing. The choice of the molecular weight, the content of isotactic polypropylene and other factors, such as the type of molding operation, i.e. whether hot or cold molding, may be varied without departing from the invention and, therefore, it is intended to include all such changes and modifications as are apparent to those skilled in this art in the scope of the appended claims.

What is claimed is:

1. As a new article of manufacture, thermoplastic tubing consisting essentially of polypropylene made up of not greater than about 20% of atactic macromolecules and at least about 80% of isotactic macromolecules, said tubing having good mechanical strength even when the walls are very thin and being resistant to damage by high-temperature liquids.

2. Tubing consisting essentially of polypropylene made up of not greater than about 20% of atactic macromolecules and at least about 80% of isotactic macromolecules, said tubing having a molecular weight of about 600,000, high mechanical strength even when the walls thereof are very thin and being resistant to damage by high temperature liquids.

3. Tubing consisting essentially of polypropylene made up of not greater than about 20% of atactic macromolecules and at least about 80% of isotactic macromolecules, having a molecular weight of 200,000, a density of about 0.90, a melting point of 164–168° C., a tensile yield point of 380 kg./cm.$^2$, an elongation of 500%, a Vicat softening point at 1.0 kg. load of 150° C., and a Vicat softening point at 5.0 kg. load of 110° C.

References Cited in the file of this patent

UNITED STATES PATENTS

| 2,645,249 | Davis et al. | July 14, 1953 |
| --- | --- | --- |
| 2,691,647 | Field et al. | Oct. 12, 1954 |
| 2,748,805 | Winstead | June 5, 1956 |
| 2,755,821 | Stahl | July 24, 1956 |
| 2,791,576 | Field et al. | May 7, 1957 |
| 2,820,252 | Koch | Jan. 21, 1958 |
| 2,824,090 | Edwards et al. | Feb. 18, 1958 |
| 2,834,054 | Maddock et al. | May 13, 1958 |
| 2,882,263 | Natta et al. | Apr. 14, 1959 |
| 2,961,711 | Diedrich et al. | Nov. 29, 1960 |

FOREIGN PATENTS

| 538,782 | Belgium | Dec. 6, 1955 |
| --- | --- | --- |
| 526,101 | Italy | Dec. 7, 1955 |

OTHER REFERENCES

Modern Plastics, vol. 31, No. 7, March 1954, "Futures for Plastics Pipe," page 73. (Copy on file in Scientific Library.)

"La Chimica e l'Industria," Anno XXXVII, No. 12 of November 1955, by G. Natta, P. Pino, and G. Mazzanti. (Copy in file in class 260/93.7.)

UNITED STATES PATENT OFFICE
CERTIFICATE OF CORRECTION

Patent No. 3,111,964　　　　　　　　　　　　　　November 26, 1963

Achille Bosoni

It is hereby certified that error appears in the above numbered patent requiring correction and that the said Letters Patent should read as corrected below.

Column 2, line 18, for "device of the" read -- device to the --.

Signed and sealed this 30th day of June 1964.

(SEAL)
Attest:

ERNEST W. SWIDER
Attesting Officer

EDWARD J. BRENNER
Commissioner of Patents